(12) United States Patent
Streich et al.

(10) Patent No.: US 7,812,240 B2
(45) Date of Patent: Oct. 12, 2010

(54) FRAGMENT SEARCH APPARATUS AND METHOD

(75) Inventors: Sebastian Streich, Delft (NL); Jordi Bonada, Barcelona (ES); Samuel Roig, Barcelona (ES)

(73) Assignee: Yamaha Corporation, Hamamatsu-shi (JP)

( * ) Notice: Subject to any disclaimer, the term of this patent is extended or adjusted under 35 U.S.C. 154(b) by 174 days.

(21) Appl. No.: 12/287,584

(22) Filed: Oct. 10, 2008

(65) Prior Publication Data

US 2009/0095145 A1    Apr. 16, 2009

(30) Foreign Application Priority Data

Oct. 10, 2007    (JP)    ............... 2007-264052

(51) Int. Cl.
*A63H 5/00* (2006.01)
(52) U.S. Cl. ..................................... 84/609
(58) Field of Classification Search ............... 84/609, 84/600, 615, 618, 622, 613, 637; 381/103
See application file for complete search history.

(56) References Cited

U.S. PATENT DOCUMENTS

| | | | |
|---|---|---|---|
| 5,877,445 A | | 3/1999 | Hufford et al. |
| 7,576,278 B2 * | | 8/2009 | Urata ........................ 84/600 |
| 7,696,426 B2 * | | 4/2010 | Cope ........................ 84/609 |
| 2007/0291958 A1 * | | 12/2007 | Jehan ........................ 381/103 |
| 2008/0115658 A1 | | 5/2008 | Fujishima et al. |

FOREIGN PATENT DOCUMENTS

| | | |
|---|---|---|
| EP | 1 923 863 A1 | 5/2008 |
| WO | WO 99/42990 | 8/1999 |
| WO | WO 2007/029002 A2 | 3/2007 |
| WO | WO 2007/029002 A3 | 3/2007 |

OTHER PUBLICATIONS

European Patent Office: Extended European Search Report for Patent Application No. 08166301.5 (Dated: Jan. 7, 2009; 9 pgs.).
Kris West and Stephen Cox, "Finding an Optimal Segmentation for Audio Genre Classification", (2005, Queen Mary, University of London; 4 pgs.).

(Continued)

*Primary Examiner*—Jianchun Qin
(74) *Attorney, Agent, or Firm*—Pillsbury Winthrop Shaw Pittman LLP

(57) ABSTRACT

Analysis section divides waveform data of a given music piece into waveform data of a plurality of fragments and divides the waveform data of each of the fragments into one or more events of sound, and obtains a character value indicative of a character of the waveform data pertaining to each of the divided events. Storage section stores respective music piece data and music piece composing data of one or more music pieces. The music piece composing data include a character value indicative of a character of the waveform data pertaining to each of the events of each of the fragments. Search section searches (or retrieves) for, from among the stored music piece composing data, one event or a plurality of successive events having a character value of a high degree of similarity to one or more events included in a designated fragment.

19 Claims, 5 Drawing Sheets

OTHER PUBLICATIONS

Kris West, Stephen Cox and Paul Lamere, "Incorporating Machine-Learning into Music Similarity Estimation", (Oct. 27, 2006, Santa Barbara, California; 5 pgs.).

Tristan Jehan, "Creating Music by Listening," Massachusetts Institue of Technology, p. 1-137, (Sep. 2005).

Deimo Schwarz, "A System for Data-Driven Concatenative Sound Synthesis," Proceeding of the COST G-6 Conference on Digital Audio Effects (DAFX-00), p. 1-6, (Dec. 9, 2000).

Ari Lazier, et al., "Mosievius: Feature Driven Interactive Audio Mosaicing," Proceedings of the 6th International Conference on Digital Audio Effects (DAFX-03), Department of Computer Science (and Music) Princeton University (London, UK), p. 1-6, (Aug. 11, 2003).

Aymeric Zils, et al., "Musical Mosaicing," Proceeding of the COST G-6 Conference on Digital Audio Effects (DAFX-01), Sony Computer Science Laboratory (Limerik, Ireland), p. 1-6, (Jun. 8, 2001).

* cited by examiner

FRAGMENT SEARCH APPARATUS AND METHOD

BACKGROUND

The present invention relates to apparatus and methods for searching (or retrieving) for waveform data of sound fragments in music piece data for purposes of editing etc. of the music piece, and a storage medium containing a computer program therefor.

Among the conventionally-known techniques pertaining to music piece editing is a technique called "audio mosaicing". According to the audio mosaicing technique, various music pieces are divided into fragments each of a short time length, so that fragment data indicative of waveforms of the individual fragments are collected to build a fragment database. Desired fragment data are selected from the fragment database, and then the selected fragment data are interconnected on the time axis to thereby create a new music piece. Examples of literatures pertaining to this type of technique include:

AriLazier, Perry Cook, "MOSIEVIUS: FEATURE DRIVEN INTERACTIVE AUDIO MOSAICING", [on line], Proc of the 6th Int. Conference on Digital Audio Effects (DAFx-03), London, UK, Sep. 8-11, 2003 [searched Mar. 6, 2007], Internet <URL: http://soundlab.cs.princeton.edu/publications/mosievius_dafx_2003.pdf> (non-patent literature 1)

Further, among the conventionally-known music-piece editing styles is a style in which operation for replacing a fragment of an existing or original music piece with a fragment of another music pieces is repeated to make a music piece having a different impression from the existing music piece. If the fragments of the existing music piece are replaced with fragments having completely different characters therefrom, then coherence will be lost between the fragments so that the thus-made music piece may completely differ from a music piece intended by a user. In order to avoid such an undesired situation, it is preferable to select, from among replacing fragments prepared in advance, fragments similar in character to fragments of an existing music piece to be edited and then use the selected fragments for replacement. Thus, in earlier-filed Japanese Patent Application No. 2006-311325 (laid-open as Japanese Patent Application Laid-open Publication No. 2008-129135), which corresponds to U.S. patent application Ser. No. 11/985,212 and European Patent Application No. 07120926.6 (Publication No. 1923863), the same assignee of the instant application proposed a music piece processing apparatus which comprises: a storage section that stores, for each of a plurality of music pieces, respective tone data of a plurality of fragments of the music piece and respective character values of the fragments; a similarity determination section that calculates a similarity index value indicative of a degree of similarity, to a character value of each of fragments of one of the plurality of music pieces (i.e., main music piece), of a character value of each individual one of the fragments of a plurality of sub music pieces other than the main music piece; and a processing section that processes the tone data of the fragments of the main music piece on the basis of the tone data of some of the fragments of the one or more sub music pieces of which the similarity index value indicates high similarity. Because the tone data of the fragments similar in character value to the individual fragments of the main music piece are used in processing the tone data of the fragments of the main music piece, the proposed music piece processing apparatus can prevent, to some extent, the processed music piece from becoming a music piece not intended or desired by the user.

As one example of a method for obtaining character values to be evaluated for similarity, it is conceivable to divide a fragment into frames each of a predetermined time length, calculate a character value per divided frame, average the character values of these frames and then set the averaged character value as a character value of the fragment. With this method, fragments to be used for tone data processing can be selected with a considerably reduced number of arithmetic operations. However, this method may present the problem that fragments clearly auditorily different in character from original fragments would be undesirably selected as replacing fragments, as detailed below.

For example, there is conceivable a case where a plurality of percussion instrument tones are being generated within a fragment. If, in such a case, all character values of the entire fragment are averaged, information indicative of presence of the plurality of percussion instrument tones will be abstracted away from the averaged character value. Also conceivable is a case where tone color variation occurs partway through a fragment, e.g. where a tone volume relatively small in the former half of the fragment gets relatively great in the latter half of the fragment. In this case, information indicative of the tone color variation partway through the fragment will be abstracted away from the averaged character value.

As noted above, the averaged character value may sometimes fail to represent an auditory character depending on the fragment. Thus, even if the scheme for replacing an original fragment with a selected fragment similar in character value to the original fragment, the original fragment may sometimes be undesirably replaced with a fragment that is not at all similar to the original fragment.

Further, in TristanJehan, "Creating Music by Listening", [on line], PhD Thesis, Massachusetts Institute of technology, September, 2005 [searched Sep. 20, 2007], Internet <URL: http://web.media.mit.edu%7Etristan/phd/pdf/Tristan_PhD_MIT.pdf> (non-patent literature 2), there is proposed a technique which divides each fragment into frames and evaluates degrees of similarity between the fragments using all of character values of the individual frames. This proposed technique permits accurate evaluation of the degrees of similarity between the fragments because none of the characters of the fragments is abstracted. With the proposed technique, however, the amount of information indicative of the character values per fragment would become enormous, and thus, a necessary memory capacity for implementing the technique and the quantity of arithmetic operations for evaluating the degrees of similarity between the fragments would also become enormous. For these reasons, it is impractical to use the proposed technique in apparatus for music piece editing.

SUMMARY OF THE INVENTION

In view of the foregoing, it is an object of the present invention to provide an improved fragment search apparatus and method which can accurately search (or retrieve) for a fragment having a character similar to a desired fragment character without extremely increasing a necessary memory capacity and necessary quantity of arithmetic operations.

In order to accomplish the above-mentioned object, the present invention provides an improved apparatus for searching for a fragment of a music piece, which comprises: a storage section that stores respective music piece data and music piece composing data of one or more music pieces, the music piece data of each of the music pieces being waveform data of the music piece, the waveform data of the music piece being managed for each of a plurality of divided fragments of the waveform data and for each of one or more events of sound included in each of the fragments, the music piece composing data of each of the music pieces including, in association with each of the one or more events included in each of the fragments, a character value indicative of a character of waveform data pertaining to the event; a designation section that designates a specific fragment from among the music piece data stored in the storage section; and a search section that searches for, from among the music piece composing data stored in the storage section, one event or a plurality of successive events having a character value of a high degree of similarity to one or more events included in the fragment designated by the designation section, and takes out the waveform data of one event or successive events, searched out thereby, from among the music piece data stored in the storage section.

According to the present invention, the waveform data of each music piece are managed not only for each of divided fragments but also for each of one or more events of sound included in (present in) each of the fragments. The music piece composing data of each of the music pieces stored in the storage section includes, in association with each of the one or more events included in each of the fragments, a character value indicative of a character of the waveform data pertaining to the event. The search section searches for, from among the music piece composing data stored in the storage section, one event or a plurality of successive events having a character value of a high degree of similarity to one event or a plurality of successive events included in a designated fragment. Namely, because the search is made using a character value corresponding to an event of sound, the present invention can accurately select a fragment similar to a desired fragment without extremely increasing the necessary memory capacity and amount of arithmetic operations.

As an example, each of the events is a section of a sound starting with a rise of the sound. The one event or the plurality of successive events to be searched for by the search section is included in one fragment. The one event or the plurality of successive events to be searched for by the search section may stride across a plurality of successive fragments. The music piece composing data of each of the music pieces include first management data for managing the waveform data of the music piece divided into a plurality of fragments, and second management data for managing the waveform data of each of the fragments divided into waveform data of each of one or more events included in the fragment.

As an example, the apparatus of the present invention further comprises an analysis section that analyzes waveform data of a given music piece by dividing the waveform data of the given music piece into waveform data of a plurality of fragments and dividing the waveform data of each of the fragments into one or more events of sound, and obtains a character value indicative of a character of the waveform data pertaining to each of the divided events. Here, not only the waveform data of the given music piece are stored into the storage section as the music piece data, but also the character value of each of the events pertaining to the waveform data of the given music piece analyzed by the analysis section is stored into the storage section as the music piece composing data.

As an example, the apparatus of the present invention may further comprise a synthesis section that uses the waveform data of the one event or successive events, taken out by the search section, for editing of music piece data or creation of new music piece data.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Figure 1:
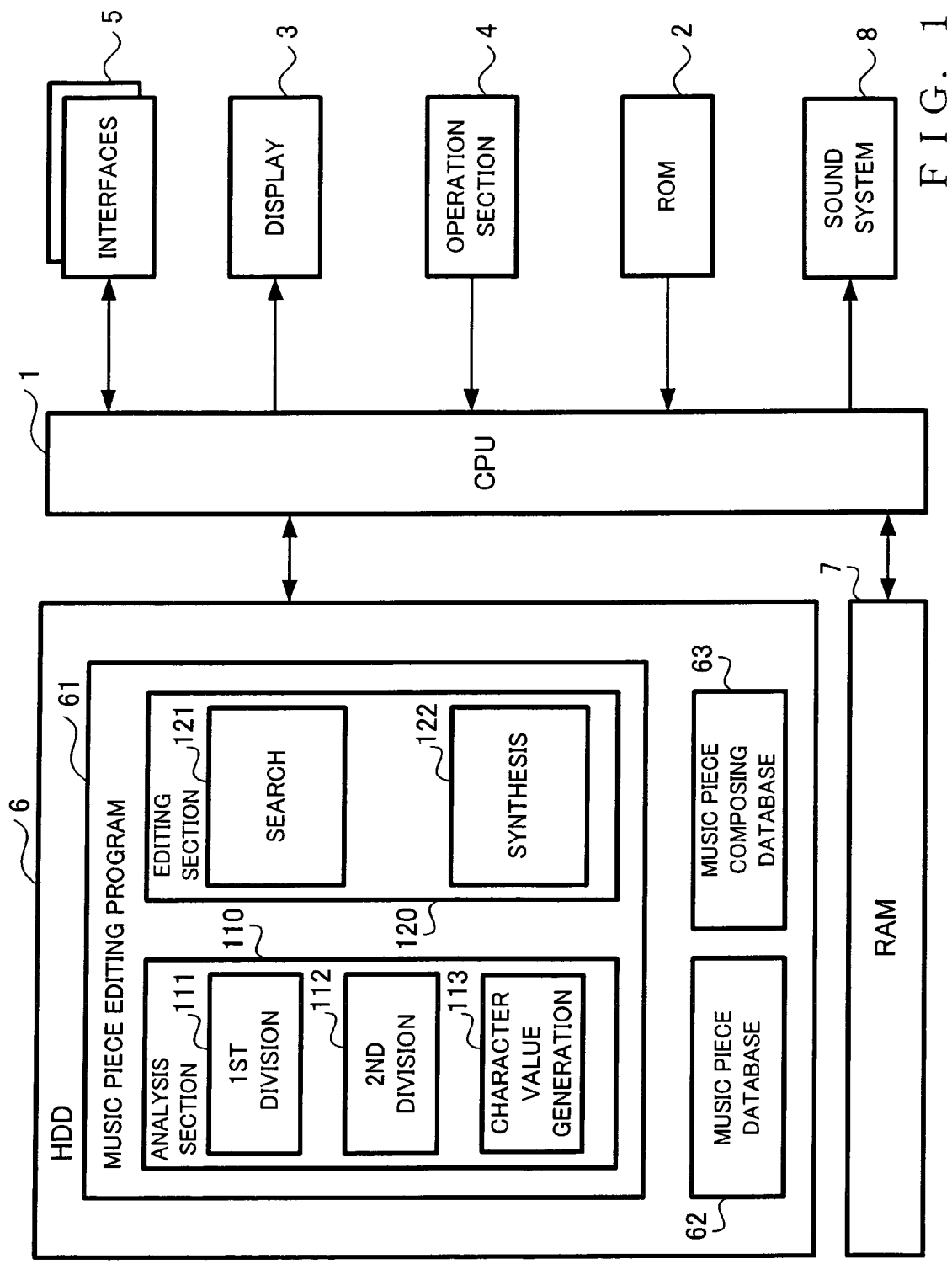
FIG. 1 is a block diagram showing a general setup of a music piece editing apparatus which is an embodiment of a fragment search apparatus of the present invention.

FIG. 1 is a block diagram showing a general setup of a music piece editing apparatus which is an embodiment of a music piece editing apparatus of the present invention. This music piece editing apparatus is implemented, for example, by installing into a personal computer a music piece editing program which is an embodiment of a fragment search program of the present invention.

In FIG. 1, a CPU 1 is a control center for controlling various sections or components of the music piece editing apparatus. ROM 2 is a read-only memory having stored therein control programs, such as a loader, for controlling fundamental behavior of the music piece editing apparatus.

Display section 3 is a device for visually displaying operational states of and input data to the music piece editing apparatus, messages to a human operator or user, etc., and it comprises, for example, a liquid crystal display (LCD) panel and a drive circuit therefor. Operation section 4 is a means for receiving various commands, instructions, and information from the user, and it comprises various operating members (operators). In a preferred implementation, the operation section 4 includes a keyboard and a pointing device, such as a mouse.

Interfaces 5 include a network interface for the music piece editing apparatus to communicate data with other apparatus via a communication network, drivers for communicating data with external storage media, such as a magnetic disk and CD-ROM.

HDD (Hard Disk Device) 6 is a non-volatile storage device for storing various programs, databases and other information. RAM 7 is a volatile memory for use as a working area by the CPU 1. In accordance with an instruction given via the operation section 4, the CPU 1 loads any of the programs, stored in the HDD 6, to the RAM 7 for execution of the program.

Sound system 8 is a means for audibly sounding (i.e., producing audible sounds of a music piece created or being editing in the music piece editing apparatus. The sound system 8 includes a D/A converter for converting a digital audio signal, which is sample data of a sound, into an analog audio signal, an amplifier for amplifying the analog audio signal, a speaker for outputting an output signal of the amplifier as an audible sound, etc. In the instant embodiment, the sound system 8, display section 3 and operation section 4 function as interfaces for not only supplying the user with information pertaining to editing of a music piece but also receiving user's instructions pertaining to editing of a music piece.

Among information stored in the HDD 6 are a music piece editing program 61, music piece database 62 and music piece composing database 63.

The music piece database 62 is a collection of sets of music piece data that comprise time-serial sample data of audio waveforms of musical instrument performance tones, vocal sounds, etc. in given music pieces. The music piece composing database 63 is a collection of sets of music piece composing data obtained by analyzing the music piece data. In a preferred implementation, such a music piece editing program 61 and music piece data are downloaded from a site in the Internet via a suitable one of the interfaces 5 and then installed into the HDD 6. In another preferred implementation, the music piece editing program 61 and music piece data are traded stored in a computer-readable storage medium, such as a CD-ROM, MD or the like; in this case, the music piece editing program 61 and music piece data are read out from the storage medium via a suitable one of the interfaces 5 and then installed into the HDD 6.

The music piece editing program 61 includes two main sections: an analysis section 110; and an editing section 120. The analysis section 110 is a routine that loads any one of the music piece data sets stored in the database 62, designated through operation via the operation section 4, into the RAM 7, analyzes the loaded music piece data and then generates a set of music piece composing data in the RAM 7. The analysis section 110 also has a function for, when a storage instruction has been given through operation via the operation section 4, additionally registering a music piece composing data set, stored in the RAM 7, into the music piece composing database 63. Here, the "music piece composing data set" include: data indicative of respective positions of a plurality of fragments constituting the music piece data (i.e., first management data); data indicative of respective positions of one or more events constituting each fragment (i.e., second management data); and data indicative of musical character values of the waveform data of each of the events (i.e., event character values). The "fragment" is obtained or defined by dividing music piece data (waveform data), for example, on a beat-by-beat basis (i.e., at each time point synchronous with a beat). Further, the "event" is an event of sound; typically, in a case where a fragment is divided at an onset of a sound (i.e., rising portion of a sound waveform), the event is a small section starting at the onset. The editing section 120 of the music piece editing program 61 is a routine that edits music piece data in the RAM 7 in accordance with user's operation via the operation section 4. One of processes performed by the creation section 120, which are characteristic of the instant embodiment of the invention, is a fragment replacement process. The fragment replacement process is a process for searching for, from among the music piece data stored in the music piece database 62, waveform data of another fragment or one event or a plurality of successive events which are similar in character to waveform data of a fragment to be replaced (hereinafter referred to as "to-be-replaced fragment") in a music piece data set to be edited ("to-be-edited music piece") and then replacing the waveform data of the to-be-replaced fragment with searched-out waveform data. The editing section 120 includes, as routines for performing the fragment replacement process, a fragment search section 121 and a synthesis section 122. In the search replacement process, the search section 121 searches through the music piece composing database 63 to find waveform data of one event or a plurality of successive events of a high degree of similarity in character value to waveform data of individual events constituting a to-be-replaced fragment, and then retrieves or takes out, from among the music piece data stored in the music piece database 62, the thus-found (search-out) waveform data of the one event or successive events. Then, the synthesis section 122 replaces the waveform data of the to-be-replaced fragment of the music piece that is an object of editing (i.e., to-be-edited music piece) with the taken-out waveform data. For which of the fragments of the to-be-edited music piece the waveform data should be replaced can be designated by the user through operation via the operation section 4. Further, one or more music piece data sets which should be searched through as a search range of replacing waveform data too can be designated by the user through operation via the operation section 4.

Next, behavior of the instant embodiment will be described. During execution, by the CPU 1, of the music piece editing program 61, the user can operate the operation section 4 to designate desired music piece data from among the music piece data stored in the music piece database 62 and then instruct the music piece editing program 61 to create music piece composing data for the music piece data and register the thus-created music piece composing data set into the music piece composing database 63. In response to such an instruction, the analysis section 110 reads out the user-designated music piece data from the music piece database 62 and stores the read-out music piece data into the RAM 7.

Figure 2:
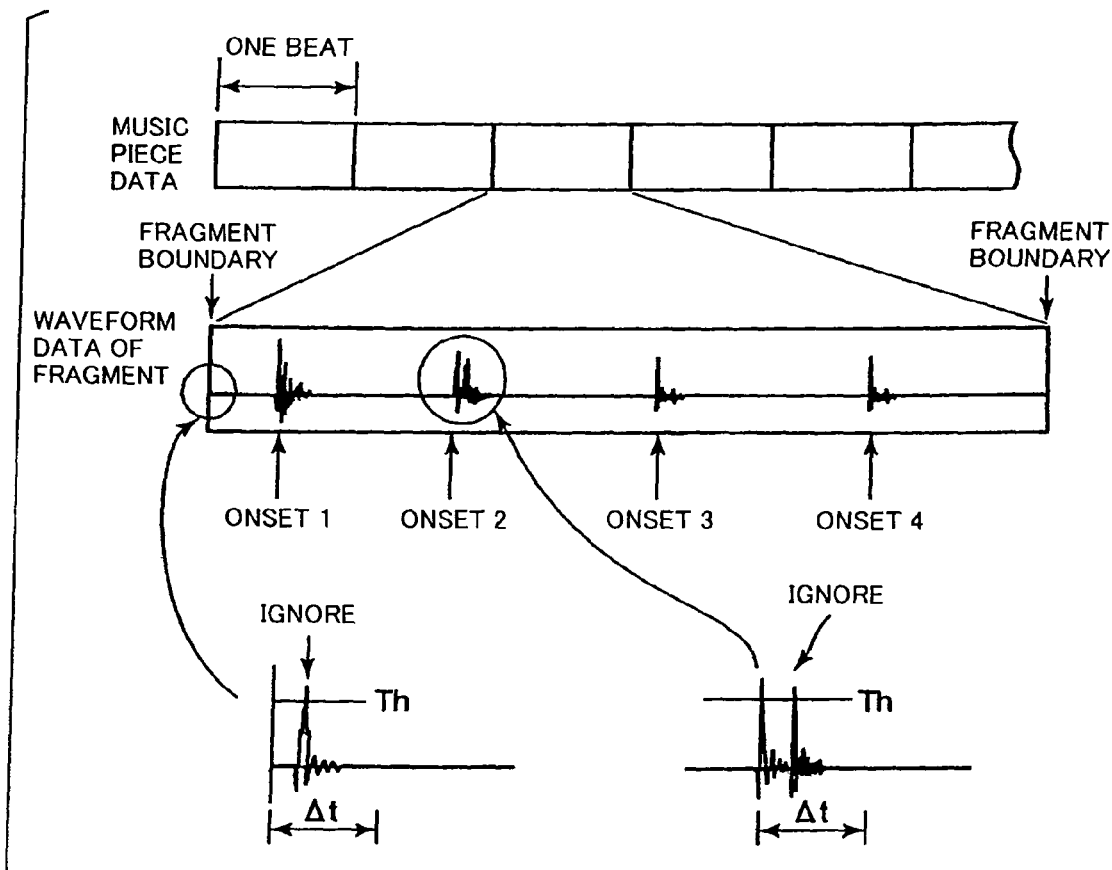
FIG. 2 is a diagram showing details of processes performed by first and second division sections employed in the embodiment.

Once such music piece data to be processed are stored into the RAM 7, first and second division sections 111 and 112 of the analysis section 110 perform their respective processes on the music piece data thus stored in the RAM 7. FIG. 2 illustrates details of the processes performed by the first and second division sections 111 and 112.

The first division section 111 divides the music piece data, stored in the RAM 7, into waveform data of fragments each having a length of one beat, and then it obtains fragment start addresses of the fragments each of which is indicative of a relative position of the fragment to the start position of the music piece data. This division may be performed using a well-known beat detection algorithm.

The second division section 112 divides the music piece data of each of the fragments into waveform data of frames each of a predetermined length, then obtains instantaneous energy of the waveform data per frame, and then determines, as an onset (sound rise) position, a point where the instantaneous energy exceeds a predetermined threshold value Th. In determining the onset position, the second division section 112 follows rules set forth below.

a) d threshold value Th is within a predetermined time Δt from a boundary between adjoining fragments, that point is not regarded as an onset position.

b) if the point where the instantaneous energy exceeds the predetermined threshold value Th is within a predetermined time Δt from an onset position immediately preceding that point, the point is not regarded as an onset position.

Then, a character value generation section 113 divides the waveform data of each of the fragments into waveform data of events each starting at an onset position and analyzes the waveform data of each of the events to generate character values for one or more types of character elements as will be later detailed. Examples of the character elements include loudness (sound volume), pitch and timbre (sound color). In this case, a portion from the onset to the next onset may be determined as one event, or a portion from the onset to a corresponding sound fall may be determined as an event. As character values of the character elements, HPCP (Harmonic Pitch Class Profile) information is used. In the instant embodiment, a collection of character values of each event, obtained or defined by dividing one fragment, is used as a material for evaluating a degree of similarity between fragments.

Waveform data of each event can be divided into frames each of a predetermined time length, and character values of waveform data can be determined per frame. Although a collection of the character values thus determined on a frame-by-frame basis accurately represents a character of the waveform data of the event, the quantity of the data tends to be enormous and difficult to handle. Thus, in the instant embodiment, the character values of each event are not a collection of per-frame character values, but "simplified" per-frame character values.

Figure 3:
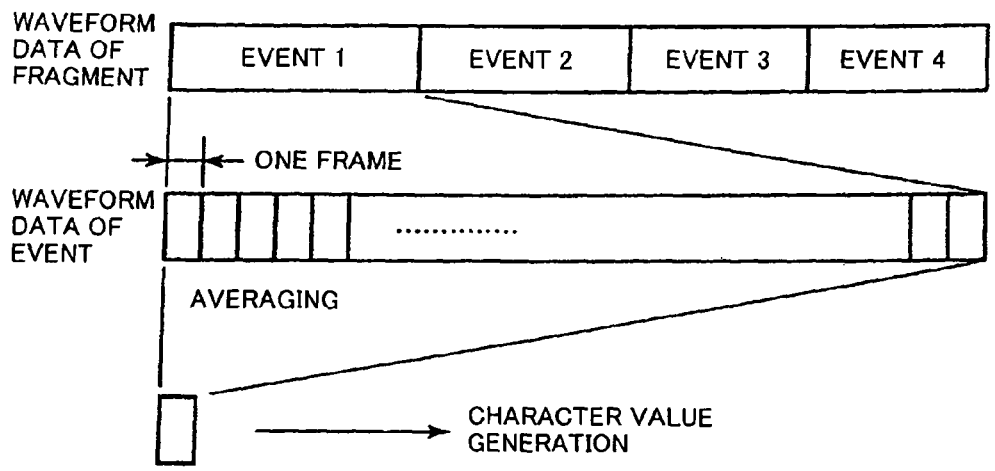
FIG. 3 is a diagram showing a first generation scheme for generating simplified character values of individual events in the embodiment.

Such simplified character values may be generated in any of various schemes. According to the first scheme, as shown in FIG. 3, waveform data of an event are divided into frames each of a predetermined time length, the waveform data of all of the frames within the event are averaged, respective character values of the character elements, "loudness", "pitch" and "timbre", of the averaged waveform data are determined, and the thus-determined character values are set as the simplified character values of the event.

Figure 4:
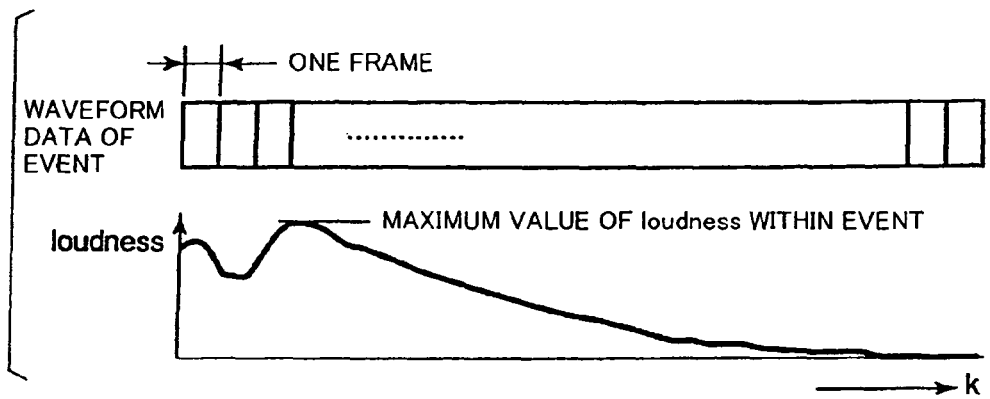
FIG. 4 is a diagram showing a way for generating a simplified character value of loudness according to a second generation scheme for generating the simplified character values of individual events in the embodiment.
Figure 5:
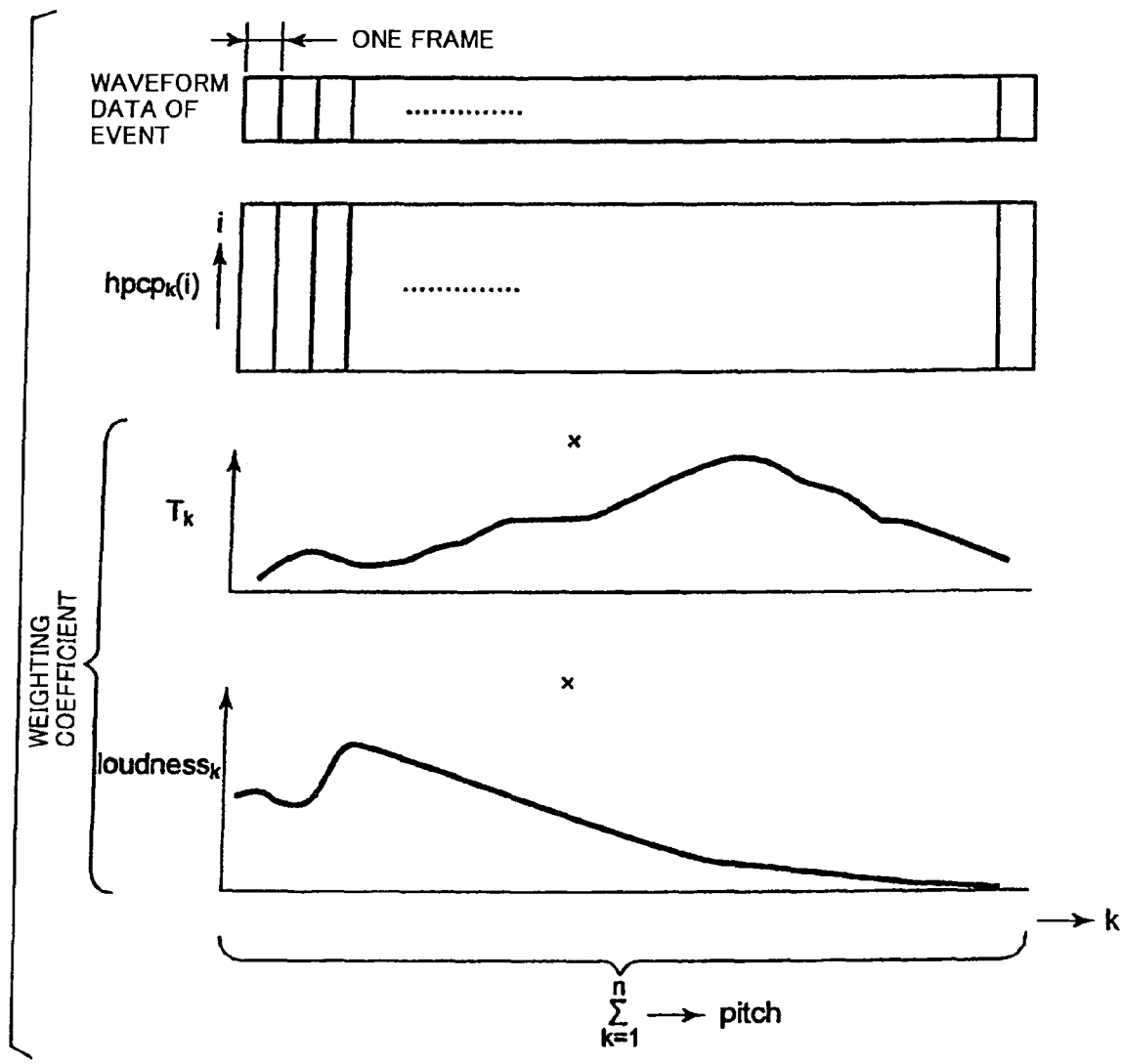
FIG. 5 is a diagram showing a way for generating a simplified character value of pitch according to the second generation scheme.

According to the second scheme, the character value generation section 113, as will be detailed later, simplifies respective character values of the character elements, "loudness", "pitch" and "timbre", using different ways (i.e., different simplifying algorithms) corresponding to the types of the character elements, to thereby determine simplified character values of the event.

a) Character Value of Loudness:

First, as shown in FIG. 4, the character value generation section 113 determines instantaneous loudness from the waveform data per frame of the event and determines the maximum value of the instantaneous loudness of all of the frames as a simplified character value of loudness.

b) Character Value of Pitch:

Next, the character value generation section 113 determines, for each of the frames, a weighting coefficient corresponding to a product between the instantaneous loudness and instantaneous pitch clearness, and, using the frame-by-frame weighting coefficients, it calculates a weighted average of instantaneous HPCP information of all of the frames of the event and determines the thus calculated weighted average as a simplified character value of pitch. This way for generating such a simplified character value of pitch is explained below with reference to FIG. 5.

First, the waveform data of the event are divided into frames, and HPCP information hpck(i)(i=1-n) is determined for each of the frames. The index "k" in the HPCP information hpck(i) indicates that the HPCP information is of the k-th frame from the start point of the event in question. Further, the index "i" in the HPCP information hpck(i) is an index indicative of a frequency of a sound, and the HPCP information hpck(i) indicates a sound intensity of the i-th frequency in the waveform data of the k-th frame. The character value generation section 113 in the instant embodiment normalizes the HPCP information hpck(i)(i=1-n) per frame in such a manner that the HPCP information hpck(i)(i=1-n) presents a maximum value of "1" (one) in each of the frames.

Then, for each of the frames from the start position to end position of the event, the character value generation section 113 determines a tonalness indicator Tk from the HPCP information hpck (i)(i=1-n) in accordance with the following mathematic expression. This tonalness indicator Tk is data indicative of instantaneous pitch clearness in the k-th frame of a sound waveform represented by the waveform data. If a result of the arithmetic operation of the following mathematic expression is a negative value, then the tonalness indicator Tk is set at "0". Therefore, the tonalness indicator Tk takes a value in the range of "0"-"49".

[Mathematical Expression 1]

$$T_k = 50 - \left(\sum_{i=1}^{n} hpcp_k(i)\right)^2$$

Then, the character value generation section 113 calculates, in accordance with the following mathematical expression, a weighted average value of the HPCP information hpck(i)(i=1-n) of all of the frames from the frame (first frame) located at the start position of the event to the frame (km-th frame) located at the end position of the event, using, as a weighting coefficient, a product between the loudness and tonalness indicator in each of the individual frames. The thus-calculated weighted average value of the HPCP information hpck(i)(i=1-n) is determined as a simplified character value of pitch.

Figure 6:
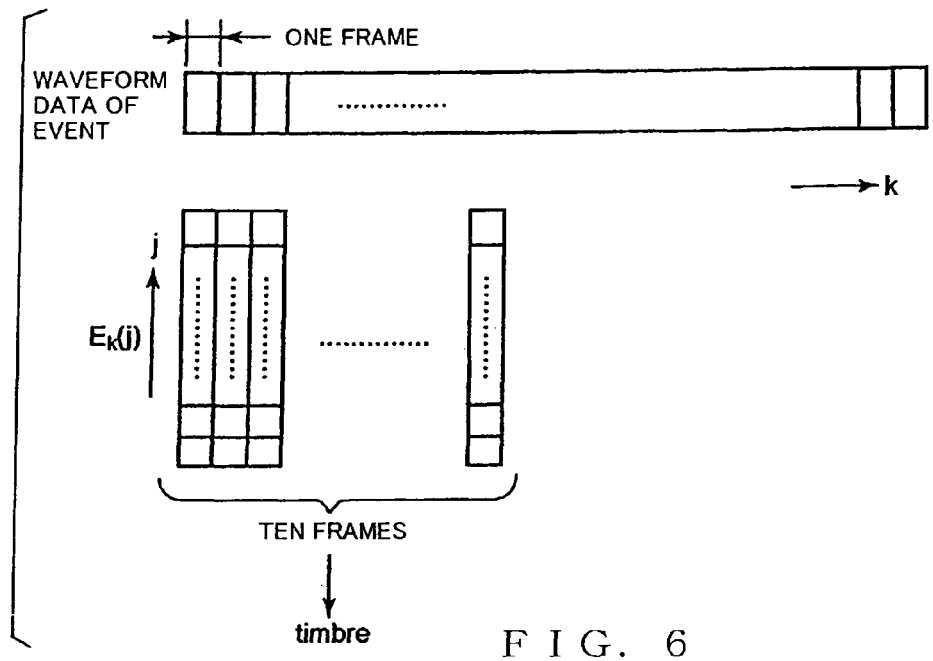
FIG. 6 is a diagram showing a way for generating a simplified character value of timbre according to the second generation scheme.

[Mathematical Expression 2]

$$\text{pitch} = \frac{1}{km}\sum_{k=1}^{km} loudness_k \cdot T_k \cdot hpcp_k(i) \ (i = 1 \sim n)$$

c) Character Value of Timbre:

Next, as shown in FIG. 6, the character value generation section 113 performs frequency division of the sound waveform, represented by the waveform data of the event, for each of ten frames from the start point of the event, to determine sound waveform energy $E_k(j)(j=1-m, k=1-10)$ for each of sub bands obtained by dividing an audio band. The sound waveform energy $E_k(j)(j=1-m, k=1-10)$ for each sub band determined for the ten frames is determined as a simplified character value of timbre. The reason why the sound waveform energy $E_k(j)(=1-m, k=1-10)$ per frame of the waveform of the ten-frame section starting at the start point of the event is used as the simplified character value of timbre is that the waveform of the ten-frame section is a waveform of a rise portion of a sound containing important information representing a timbre or sound color.

The foregoing are the ways for generating simplified character values of loudness, pitch and timbre according to the second scheme in the instant embodiment.

Once the character value generation section 113 obtains the simplified character values of loudness, pitch and timbre in the aforementioned manner, it builds a music piece composing data set. Here, a music piece composing data set corresponding to one music piece data set contain the following information.

a) ID information identifying the corresponding music piece data set (such as a file name of the music piece data set, location, in the HDD 6, of the music piece data set, etc.).

b) Fragment start addresses of waveform data of a plurality of fragments obtained by dividing the music piece data set. The fragment start addresses are relative addresses indicative of relative positions of start addresses of the waveform data of the individual fragments to the start point of the music piece data set.

c) Event start addresses of waveform data of a plurality of events obtained by dividing the waveform data of each of the fragments. Each of the event start addresses is a relative address indicative of a relative position of a start position of the waveform data of the event to the start point of the waveform data of the fragment to which the event belongs.

d) Simplified character values of loudness, pitch and timbre obtained from the waveform data of the individual events.

Figure 7:
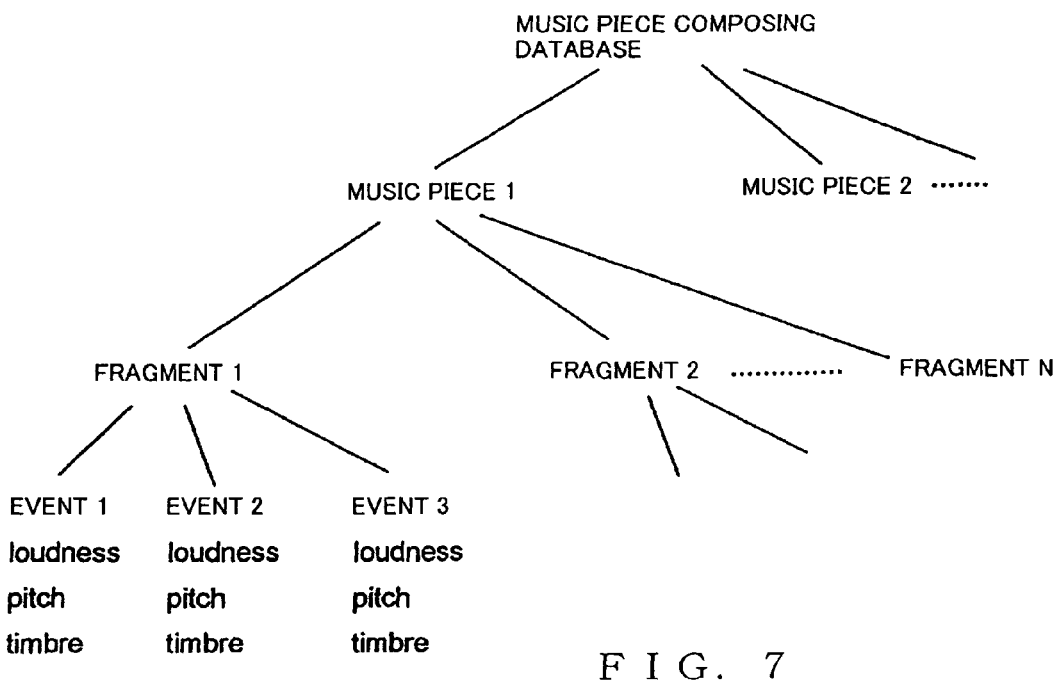
FIG. 7 is a diagram showing a construction of a music piece composing database employed in the embodiment.

Then, the character value generation section 113 registers the music piece composing data set, generated in the above-described manner, into the music piece composing database 63. FIG. 7 shows a construction of the music piece composing database 63.

The foregoing are example behavior of the analysis section 110 employed in the instant embodiment.

Next, a description will be given about example behavior of the editing section 120. During execution, by the CPU 1, of the music piece editing program 61, the user can operate the operation section 4 to designate a music piece data set to be edited. Once such designation of the music piece data set is made, the editing section 120 in the music piece editing program 61 reads out the designated music piece data set from the music piece database 62 within the HDD 6 and stores the read-out music piece data set into the RAM 7. In this condition, the user can request execution of the fragment replacement process. At that time, the user designates the following through operation via the operation section 4:

a) position of a to-be-replaced fragment in the music piece data which should be replaced with waveform data of another fragment; and b) one or more music piece data sets which are among the music piece data sets with their respective music piece composing data sets registered in the music piece composing database 63 and through a which a fragment to replace the to-be-replaced fragment should be searched for (i.e., music piece data sets as a fragment search range).

Regarding item a. above, in order to receive from the user information designating a to-be-replaced fragment, the editing section 120 causes the display section 3 to display a graphic, such as one consisting of stripes, representative of the to-be-edited music piece data set divided into a plurality of fragments, and causes the user to designate a position, on the displayed graphic, of the to-be-replaced fragment, for example, via the pointing device of the operation section 4. At that time, the waveform data of the user-designated fragment may be read out from a to-be-edited music piece storage area of the RAM 7 and delivered to the sound system 8 to be output as an audible sound, so that it can be readily confirmed whether or not the user could properly designate the desired to-be-replaced fragment. Further, it is also possible for the user to designate all of the fragments of the to-be-edited music piece data set as to-be-replaced fragments.

Regarding item b. above, it is also possible for the user to designate all of the music piece data sets, having their respective music piece composing data sets registered in the music piece composing database 63, as the range of search for a fragment to replace the to-be-replaced fragment.

Once designating information regarding the a. and b. items, the search section 121 in the editing section 120 reads out, from among the music piece composing data stored in the music piece composing database 63 and corresponding to the to-be-edited music piece data, character values of loudness, pitch and timbre of one or more events belonging to the to-be-replaced fragment. Then, by searching through the database 63, the search section 121 finds waveform data of one event or a plurality of successive events having character values of a high degree of similarity to character values of individual events of the to-be-replaced fragment. In the instant embodiment, the following two search schemes are provided for searching the music piece composing database 63; the user is allowed to select a desired one of these two ways through operation via the operation section 4.

<First Search Scheme>

Figure 8:
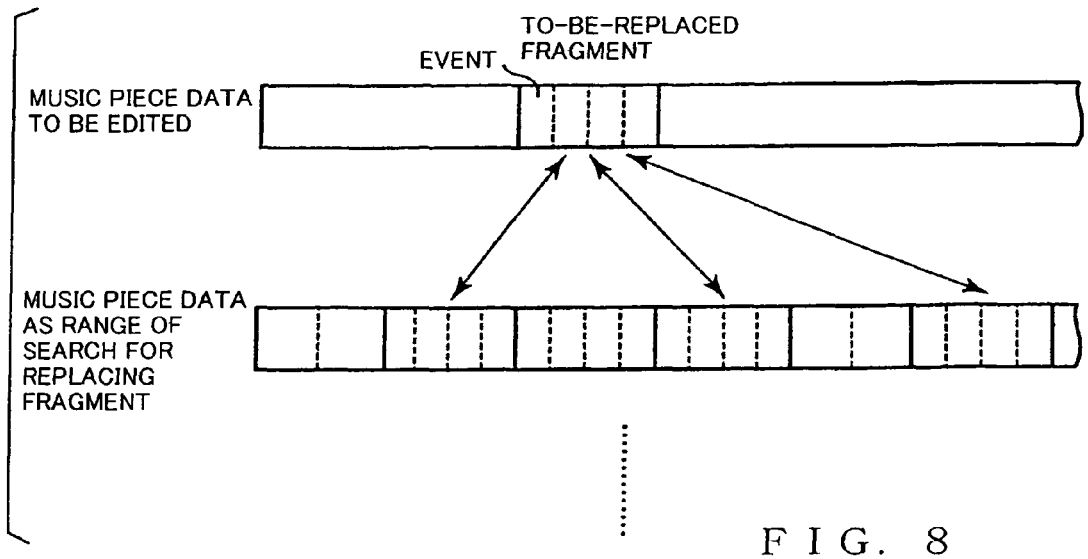
FIG. 8 is a diagram showing a first search scheme performed by a search section employed in the embodiment.

FIG. 8 is a diagram showing how a fragment that should replace the to-be-replaced fragment is searched using the first search scheme. With the first search scheme, the user obtains a replacing fragment in accordance with the following operational sequence.

(1) The search section 121 finds, from among the music piece composing data sets stored the music piece composing database 63, one or more music piece composing data sets corresponding to one or more music piece data sets designated by the user as the range of search.

(2) The search section 121 selects, from among the fragments of the music piece composing data set found at (1) above, each fragment having the same number of events as the to-be-replaced fragment. In the illustrated example of FIG. 8, the number of events in the to-be-replaced fragment is four, and thus, fragments in each of which the number of events is four is selected from a music piece data set designated as the range of search.

(3) The individual fragments selected at (2) above are sequentially selected, a degree of similarity D between character values of loudness, pitch and timbre of each of the events in the selected fragment and character values of loudness, pitch and timbre of each of the events in the to-be-replaced fragment is calculated, for example, in accordance with the following mathematical expression:

$$D = A \cdot D1 + B \cdot D2 + C \cdot D3$$

Here, "D1" indicates a degree of similarity between a character value vector consisting of the loudness of each of the events in the selected fragment and a character value vector consisting of the loudness of each of the events in the to-be-replaced fragment, which is a value determined, for example, in accordance with an Euclidean distance between the two character value vectors. "D2" indicates a degree of similarity between a character value vector consisting of the pitch of each of the events in the selected fragment and a character value vector consisting of the pitch of each of the events in the to-be-replaced fragment, which is a value determined, for example, in accordance with a cosine angle between the two character value vectors. "D3" indicates a degree of similarity between a character value vector consisting of the timbre of each of the events in the selected fragment and a character value vector consisting of the timbre of each of the events in the to-be-replaced fragment, which is a value determined, for example, in accordance with an Euclidean distance between the two character value vectors. Further, "A", "B" and "C" are respective weighting coefficients of the degree of similarity D1 between the character value vectors of loudness, degree of similarity D2 between the character value vectors of pitch and degree of similarity D3 between the character value vectors of timbre.

(4) Highest degree of similarity Dmax is obtained from among the various degrees of similarity D determined at (3) above. Then, the search section 121 determines the position of the fragment of which the highest degree of similarity Dmax has been obtained, i.e. music piece data set to which the fragment belongs and start and end addresses, in the music piece data set, of the waveform data of the fragment, with reference to the music piece composing data set.

The above-described first search scheme is effective in cases where a relatively great number of music piece data sets are designated as the range of search.

<Second Search Scheme>

Figure 9:
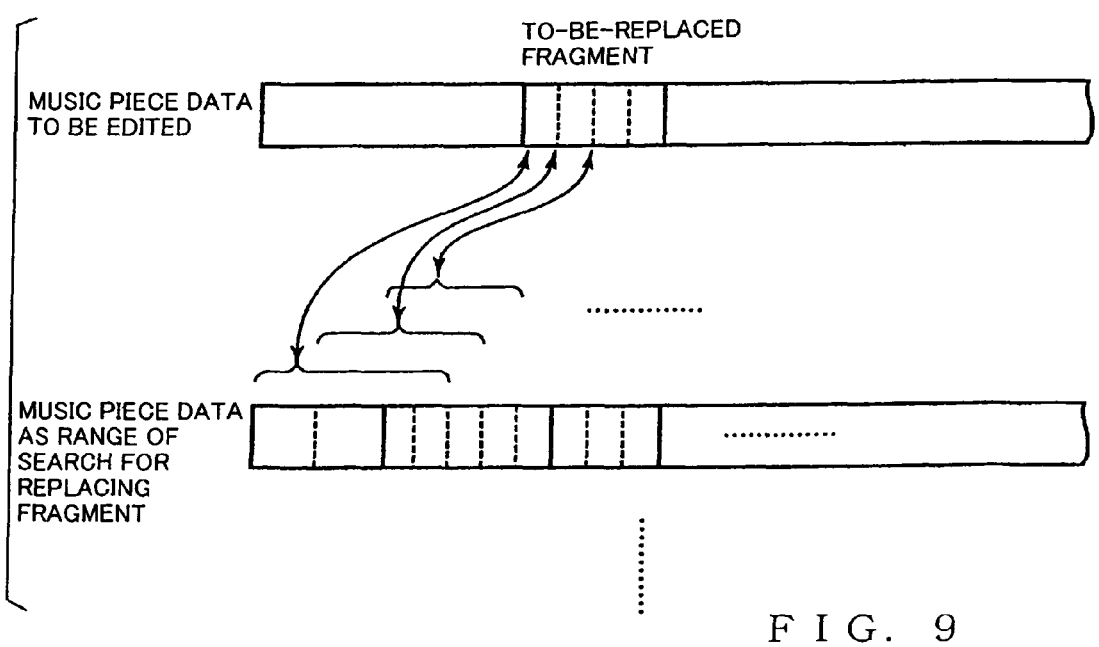
FIG. 9 is a diagram showing a second search scheme performed by the search section employed in the embodiment.

FIG. 9 is a diagram showing how a fragment that should replace the to-be-replaced fragment is searched using the second search scheme. With the second search scheme, the user obtains a replacing fragment in accordance with the following operational sequence.

(1) The search section 121 finds, from the music piece composing data sets stored the music piece composing database 63, one or more music piece composing data sets corresponding to one or more music piece data sets designated by the user as the range of search, as with the first search scheme.

(2) The search section 121 sequentially selects, from among the fragments of the music piece composing data found at (1) above, sets of successive events equal in number as the number of events in the to-be-replaced fragment, ignoring boundaries between fragments in the original music piece data. In the illustrated example of FIG. 9, the number of events in the to-be-replaced fragment is four, and thus, sets of four successive events are selected from the music piece data designated as the range of search.

(3) For each of the sets of successive events selected at (2) above, a degree of similarity D between character values of loudness, pitch and timbre of each of the events in the sets and character values of loudness, pitch and timbre of each of the events in the to-be-replaced fragment is calculated.

(4) Highest degree of similarity Dmax is obtained from among the various degrees of similarity D determined at (3) above. Then, the search section 121 determines the position of the waveform data of the set of successive events of which the highest degree of similarity Dmax has been obtained (this set of successive events may correspond to one fragment of the original music piece data set or may stride across a boundary between fragments of the original music piece data set), i.e. music piece data set to which the waveform data of the set of successive events belong and start and end addresses, in the music piece data set, of the waveform data, with reference to the music piece composing data set.

The above-described second search scheme is effective in cases where a small number of music piece data sets are designated as the range of search.

Then, the search section 121 passes to the synthesis section 122 the music piece data which the waveform data of the replacing fragment or set of successive events, determined in the aforementioned manner, belong to and the start and end addresses, in the music piece data, of the replacing fragment or set of successive events. On the basis of the passed information, the synthesis section 122 reads out the waveform data of the replacing fragment or set of successive events from the music piece database 62 and then replaces the waveform data of the to-be-replaced fragment in the music piece data set, currently stored in the to-be-edited music piece storage area of the RAM 7, with the read-out waveform data.

In some cases, the waveform data of the replacing fragment or set of successive events may be of a time length not equal to a time length of the waveform data of the to-be-replaced fragment. Thus, in the case where the waveform data of the replacing fragment or set of successive events is of a greater time length than the waveform data of the to-be-replaced fragment, the synthesis section 122 decreases the time length of the former to agree with the time length of the latter, while, in the case where the waveform data of the replacing fragment or set of successive events is of a smaller time length than the waveform data of the to-be-replaced fragment, the synthesis section 122 increases the time length of the former to agree with the time length of the latter. Such time length adjustment of the waveform data may be made in various ways. In a preferred implementation, attention is focused on a section of the replacing waveform data where substantially the same waveform is repeated with substantially the same sound volume level is repeated, and the time length adjustment of the waveform data is increased or decreased by increasing or decreasing the number of the waveform repetitions in that section. In another preferred implementation, attention is focused on a silent section of the replacing waveform data or a section where the sound level is below a predetermined threshold value, and part of that section is deleted or a copy of part of that section is inserted, to increase or decrease the time length of the replacing waveform data. If the time length of the replacing waveform data differs among the events, the waveform data of the event of the greatest time length may be used for the time length adjustment.

In the above-described instant embodiment of the present invention, when a set of waveform data of a to-be-replaced fragment in a to-be-edited music piece data set has been designated, waveform data of a fragment or successive events having character values similar to character values of individual events of the waveform data of the to-be-replaced fragment are taken out from among one or more music piece data sets stored in the music piece database 62 and designated as a range of search, and then the thus taken-out waveform data are used for replacement of the waveform data of the to-be-replaced fragment. Thus, the instant embodiment can accurately select a fragment similar to the to-be-replaced fragment and use the selected fragment for editing of the waveform data of the to-be-replaced fragment, without extremely increasing the necessary memory capacity and amount of arithmetic operations.

Whereas the foregoing have described one embodiment of the present invention, various other embodiments are possible, such as those set forth below.

(1) When waveform data of a to-be-replaced fragment of a to-be-edited music piece data set are to be replaced with waveform data of a replacing fragment or successive events, the synthesis section 122 may adjust the sound volume level of the waveform data of the replacing fragment or successive events so as to conform to the sound volume level of waveform data in front and rear portions of the to-be-replaced fragment in the to-be-edited music piece data set.

(2) Arrangements may be made such that the weighting coefficients A, B and C in the mathematical expression to be used by the search section 121 for calculating the degree of similarity D can be adjusted by the user operating the operation section 4. This modification is advantageous in that the user can select for which one of the types of character elements the character value should be given more emphasis in searching for a replacing fragment or successive events.

(3) Music piece data set and corresponding music piece composing data set may be divided into groups, for example, in accordance with their musical genre, and a replacing fragment or successive events may be searched for with music piece data or music piece composing data within any of the groups, selected by the user operating the operation section 4, designated as the range of search.

(4) In the above-described embodiment, the synthesis section 122 is arranged to use waveform data of a fragment or successive events, of which the highest degree of similarity Dmax has been obtained, for replacement of waveform data of a to-be-replaced fragment. Alternatively, the synthesis section 122 may determine a replacing fragment or successive events in the following manner. Namely, first, the display section 3 is caused to display a predetermined number of icons indicative of a predetermined number of fragments or successive events of which high degrees of similarity have been obtained. Then, once the user designates a desired one of the icons by operating the operation section 4, waveform data of the fragment or successive events corresponding to the designated icon are read out from the music piece data set to which the waveform data of the fragment or successive events belong, and the thus read-out waveform data are sent to the sound system 8 to allow the user to test-listen to a sound of the fragment or successive events. If the user likes the sound of the fragment or successive events and once the user operates the operation section 4 to instruct the synthesis section 122 to decide on the fragment or successive events, the synthesis section 122 decides on the fragment or successive events, which the user listened to, as a replacing fragment or successive events.

(5) The above-described embodiment is arranged to find, from one or more other music pieces than a to-be-edited music piece, a fragment similar in character value to a to-be-replaced fragment actually included in the to-be-edited music piece. Alternatively, however, character values of a virtual or non-existent to-be-replaced fragment may be synthesized, and a fragment similar in character value to the virtual to-be-replaced fragment may be searched from one or more other music pieces than a to-be-edited music piece. For example, in a case where an to-be-edited music piece includes fragments A and B, a process may be performed in which character values of individual events in a virtual to-be-replaced fragment are synthesized assuming, for example, that former-half events of fragment A and latter-half events of fragment B are former-half events and latter-half events, respectively, of the virtual to-be-replaced fragment, and in which a fragment similar in character value to the virtual to-be-replaced fragment is searched from one or more other music pieces than a to-be-edited music piece, so that a given fragment in the to-be-edited music piece can be replaced with the searched-out fragment.

(6) The above-described embodiment is arranged to edit music piece data by replacing waveform data of a to-be-replaced fragment with waveform data of a replacing fragment. However, the editing in the present invention may be performed by other than the fragment replacement. For example, waveform data of a fragment in original music piece data and waveform data obtained through a search may be mixed together so that a fragment in the original music piece data is replaced with the resultant mixed waveform data.

(7) In the above-described embodiment, the inventive fragment search apparatus is embodied as a music piece editing apparatus. However, the fragment search apparatus of the invention may be embodiment as other than the music piece editing apparatus. As another embodiment of the present invention, a searched result pertaining to waveform data of a fragment constituting a music piece data set may be used for other purposes than music piece editing.

This application is based on, and claims priority to, JP PA 2007-264052 filed on 10 Oct. 2007. The disclosure of the priority application, in its entirety, including the drawings, claims, and the specification thereof, is incorporated herein by reference.

What is claimed is:

1. An apparatus for searching for a fragment of a music piece, which comprises:
a storage section that stores respective music piece data and music piece composing data of one or more music pieces, the music piece data of each of the music pieces being waveform data of the music piece, the waveform data of the music piece being managed for each of a plurality of divided fragments of the waveform data and for each of one or more events of sound included in each of the fragments, the music piece composing data of each of the music pieces including, in association with each of the one or more events included in each of the fragments, a character value indicative of a character of waveform data pertaining to the event;
a designation section that designates a specific fragment from among the music piece data stored in said storage section; and
a search section that searches for, from among the music piece composing data stored in said storage section, one event or a plurality of successive events having a character value of a high degree of similarity to one or more events included in the fragment designated by said designation section, and takes out the waveform data of one event or successive events, searched out thereby, from among the music piece data stored in said storage section.

2. The apparatus as claimed in claim 1 wherein each of the events is a section of a sound starting with a rise of the sound.

3. The apparatus as claimed in claim 1 wherein the one event or the plurality of successive events to be searched for by said search section is included in one fragment.

4. The apparatus as claimed in claim 3 wherein the music piece composing data of each of the music pieces further include, as first management data for managing the waveform data of the music piece divided into the plurality of fragments, data indicative of respective positions, in said storage section, of the waveform data of individual ones of the fragments, and
said search section takes out, from among the music piece data stored in said storage section in accordance with said first management data, the waveform data of the fragment including the searched-out one event or successive events.

5. The apparatus as claimed in claim 1 wherein the one event or the plurality of successive events to be searched for by said search section stride across a plurality of successive fragments.

6. The apparatus as claimed in claim 5 wherein the music piece composing data of each of the music pieces include, as second management data for managing the waveform data of each of the fragments divided into the waveform data of one or more events included in the fragment, data indicative of respective positions, in said storage section, the waveform data of individual ones of the events, and said search section takes out, from among the music piece data stored in said storage section in accordance with at least said second management data, the waveform data of the searched-out one event or successive events.

7. The apparatus as claimed in claim 1 wherein the music piece composing data of each of the music pieces include first management data for managing the waveform data of the music piece divided into a plurality of fragments, and second management data for managing the waveform data of each of the fragments divided into waveform data of each of one or more events included in the fragment.

8. The apparatus as claimed in claim 1 wherein said storage section has stored therein character values of a plurality of types of character elements as a character value indicative of a character of the waveform of the event.

9. The apparatus as claimed in claim 8 wherein said plurality of types of character values include any of sound volume, pitch and timbre.

10. The apparatus as claimed in claim 1 wherein each of the fragments is a section defined by dividing a music piece at each time point synchronous with a beat.

11. The apparatus as claimed in claim 1 which further comprises an analysis section that analyzes waveform data of a given music piece by dividing the waveform data of the given music piece into waveform data of a plurality of fragments and dividing the waveform data of each of the fragments into one or more events of sound, and obtains a character value indicative of a character of the waveform data pertaining to each of the divided events, and wherein not only the waveform data of the given music piece are stored into said storage section as the music piece data, but also the character value of each of the events pertaining to the waveform data of the given music piece analyzed by said analysis section is stored into said storage section as the music piece composing data.

12. The apparatus as claimed in claim 11 wherein said analysis section divides the waveform data of a given event into frames each of a predetermined time length, obtains average waveform data of all frames of the given event, and analyzes the waveform data to generate a character value of the given event.

13. The apparatus as claimed in claim 11 wherein, for the waveform data of the given event, said analysis section obtains values of a plurality of types of character elements per frame of the predetermined time length and simplifies the values of the plurality of types of character elements in each of the frames in accordance with simplifying algorithms determined depending on the types of character elements, and wherein said analysis section generates the simplified values as respective character values of the character elements for the given event.

14. The apparatus as claimed in claim 13 wherein said plurality of types of character elements are sound volume, pitch and timbre, and wherein said analysis section generates character values of the given event by: determining, as a simplified sound volume, a maximum value of sound volumes of all of the frames in the given event and generating the determined simplified sound volume as a character value of the sound volume; determining, as a simplified pitch, a weighted average of instantaneous pitches of all of the frames in the given event calculated using a weighting coefficient corresponding to a product between an instantaneous sound volume and instantaneous pitch clearness of each of the frames in the given event and generating the determined simplified pitch as a character value of the pitch; and determining, as a simplified timbre, an instantaneous timbre of a predetermined number of frames starting at a start point of the given event and generating the determined simplified timbre as a character value of the timbre.

15. The apparatus as claimed in claim 1 which further comprises a synthesis section that uses the waveform data of the one event or successive events, taken out by said search section, for editing of music piece data or creation of new music piece data.

16. A method for execution by a computer for searching for a fragment of a music piece by use of a storage section that stores respective music piece data and music piece composing data of one or more music pieces, the music piece data of each of the music pieces being waveform data of the music piece, the waveform data of the music piece being managed for each of a plurality of divided fragments of the waveform data and for each of one or more events of sound included in each of the fragments, the music piece composing data of each of the music pieces including, in association with each of the one or more events included in each of the fragments, a character value indicative of a character of waveform data pertaining to the event, said method comprising:

a step of designating a specific fragment from among the music piece data stored in the storage section; and a step of searching for, from among the music piece composing data stored in the storage section, one event or a plurality of successive events having a character value of a high degree of similarity to one or more events included in the fragment designated by said step of designating, and taking out the waveform data of one event or successive events, searched out by said step of searching, from among the music piece data stored in the storage section.

17. The method as claimed in claim 16 which further comprises:

a step of analyzing waveform data of a given music piece by dividing the waveform data of the given music piece into waveform data of a plurality of fragments and dividing the waveform data of each of the fragments into one or more events of sound, and obtaining a character value indicative of a character of the waveform data pertaining to each of the divided events, and a step of not only storing the waveform data of the given music piece into the storage section as the music piece data but also storing the character value of each of the events pertaining to the waveform data of the given music piece, analyzed by said step of analyzing, into the storage section as the music piece composing data.

18. A computer-readable storage medium containing a program for searching for a fragment of a music piece by use of a storage section that stores respective music piece data and music piece composing data of one or more music pieces, the music piece data of each of the music pieces being waveform data of the music piece, the waveform data of the music piece being managed for each of a plurality of divided fragments of the waveform data and for each of one or more events of sound included in each of the fragments, the music piece composing data of each of the music pieces including, in association with each of the one or more events included in each of the fragments, a character value indicative of a character of waveform data pertaining to the event, said program comprising:

a step of designating a specific fragment from among the music piece data stored in the storage section; and a step of searching for, from among the music piece composing data stored in the storage section, one event or a plurality of successive events having a character value of a high degree of similarity to one or more events included in the fragment designated by said step of designating, and taking out the waveform data of one event or successive events, searched out by said step of searching, from among the music piece data stored in the storage section.

19. The computer-readable storage medium as claimed in claim 18 wherein said program further comprises:

a step of analyzing waveform data of a given music piece by dividing the waveform data of the given music piece into waveform data of a plurality of fragments and dividing the waveform data of each of the fragments into one or more events of sound, and obtaining a character value indicative of a character of the waveform data pertaining to each of the divided events, and a step of not only storing the waveform data of the given music piece into the storage section as the music piece data but also storing the character value of each of the events pertaining to the waveform data of the given music piece, analyzed by said step of analyzing, into the storage section as the music piece composing data.

* * * * *